M. DAVIS.
GRAIN WEIGHING AND BAGGING MACHINE.
APPLICATION FILED APR. 17, 1908.
915,941.
Patented Mar. 23, 1909.
3 SHEETS—SHEET 1.
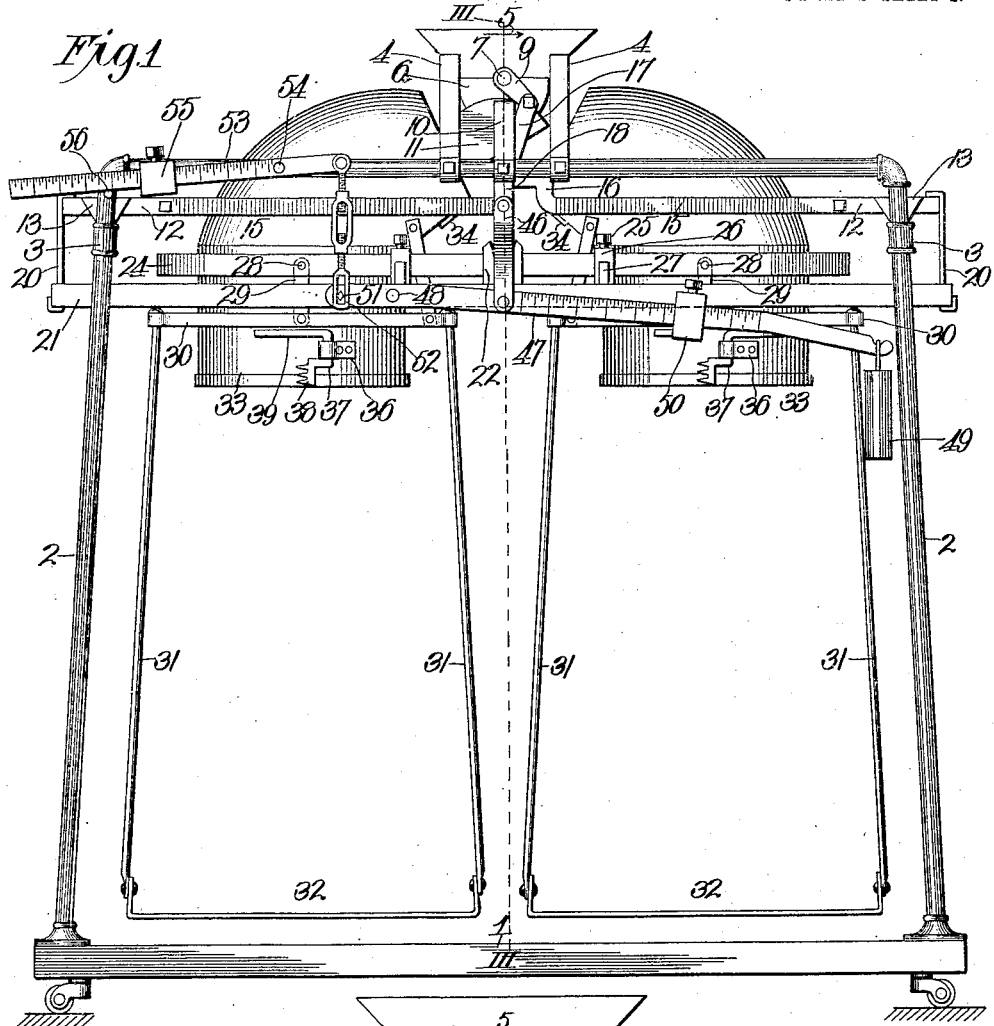
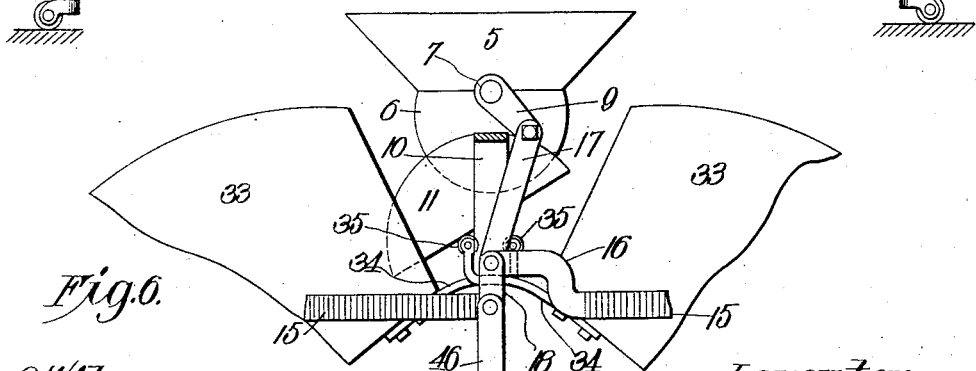
Witnesses
Frank R Glon
H. C. Rodgers
Inventor
Monroe Davis
By George H Thorpe, atty.

M. DAVIS.
GRAIN WEIGHING AND BAGGING MACHINE.
APPLICATION FILED APR. 17, 1908.
915,941.
Patented Mar. 23, 1909.
3 SHEETS—SHEET 2.
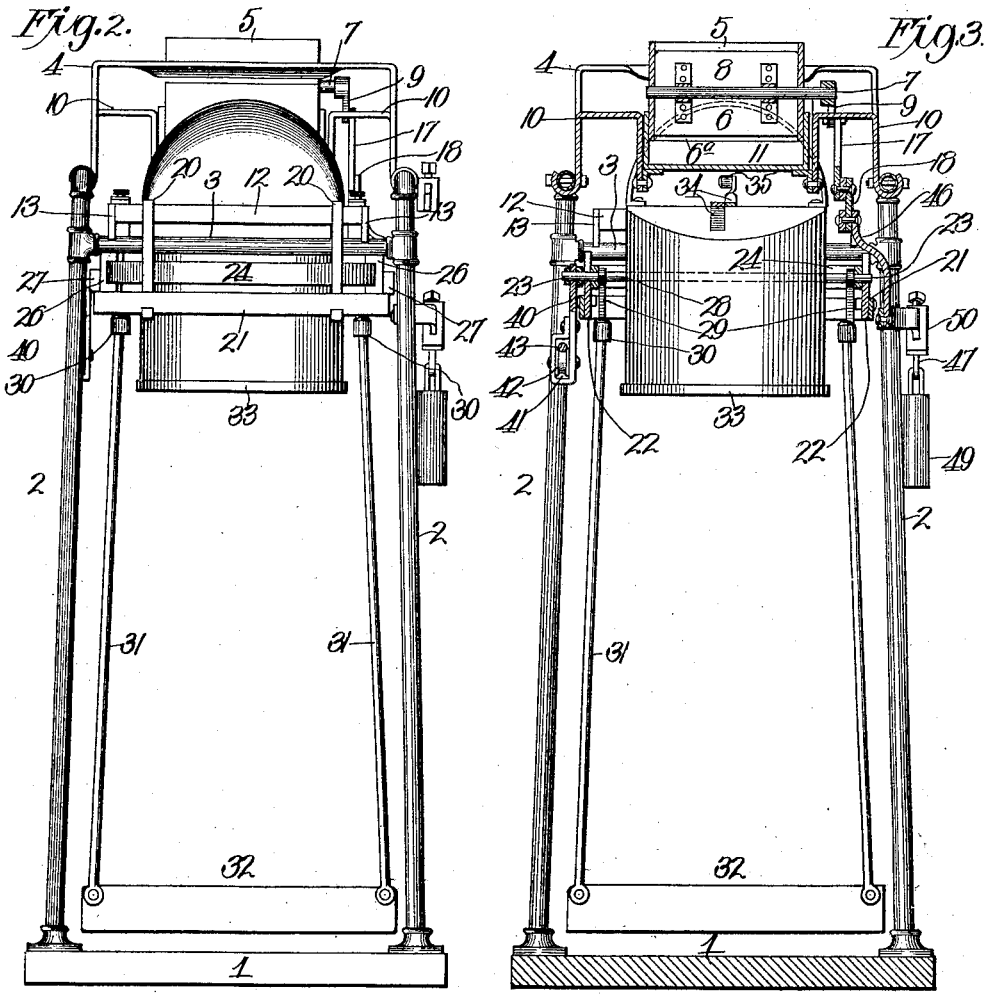
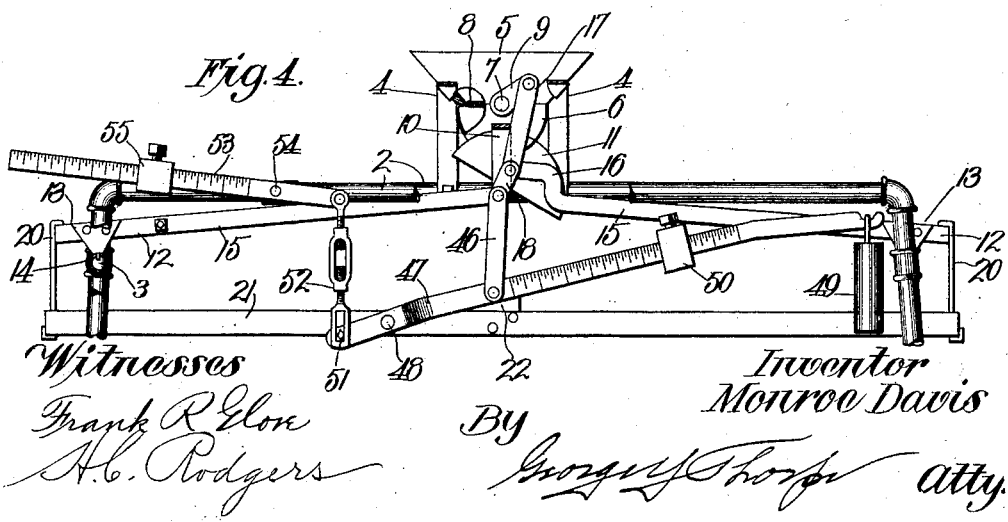
Witnesses
Frank R Elon
H. C. Rodgers
Inventor
Monroe Davis
By George J. Thorpe atty.

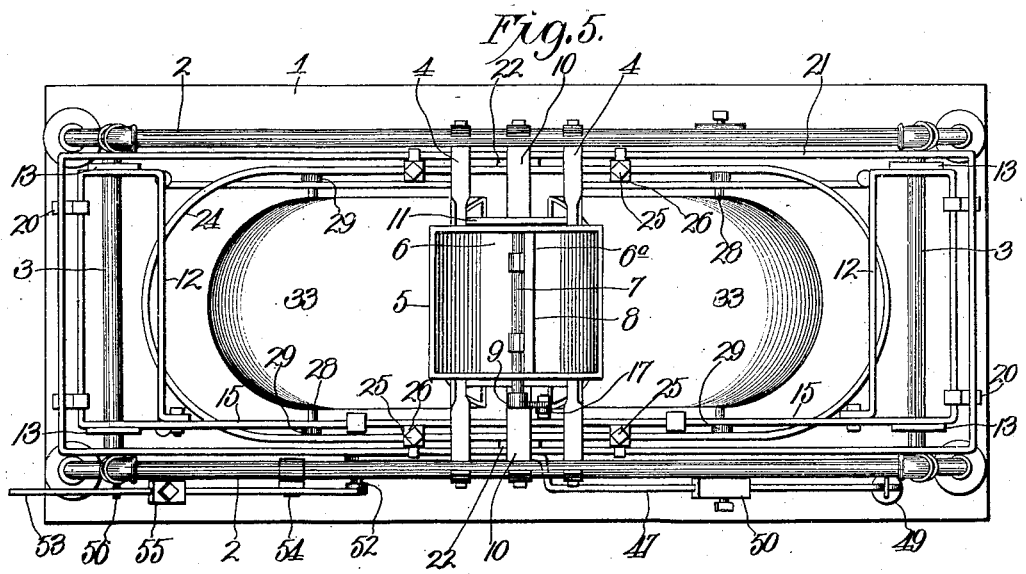
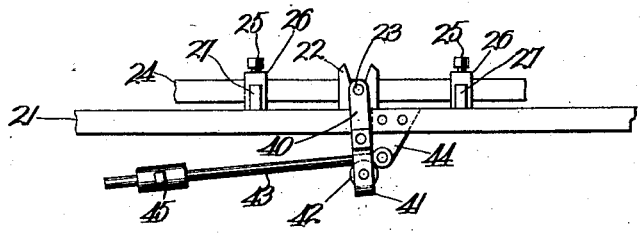
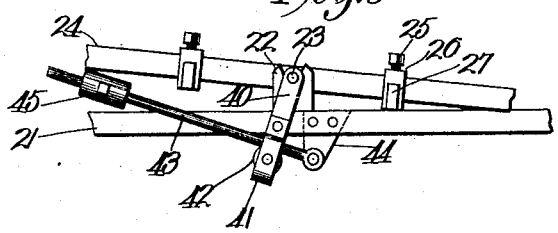

UNITED STATES PATENT OFFICE.

MONROE DAVIS, OF BLACKWELL, OKLAHOMA.

GRAIN WEIGHING AND BAGGING MACHINE.

No. 915,941.  Specification of Letters Patent.  Patented March 23, 1909.

Application filed April 17, 1908. Serial No. 427,735.

*To all whom it may concern:*

Be it known that I, MONROE DAVIS, citizen of the United States, residing at Blackwell, in the county of Kay and State of Oklahoma, have invented certain new and useful Improvements in Grain Weighing and Bagging Machines, of which the following is a specification.

This invention relates to grain weighing and bagging machines and is designed more especially as an improvement in a grain weighing and bagging machine on which I filed application for patent May 28, 1907, Ser. No. 376,158, my object in this connection being to produce a machine which will perform the weighing operation more accurately than the machine forming the subject matter of the above mentioned application.

A further object is to produce a machine in which the flow of the grain is materially reduced preliminary to its complete cessation or arrest.

With these objects in view and others as hereinafter appear, the invention consists in certain novel and peculiar features of construction and organization as hereinafter described and claimed; and in order that it may be fully understood reference is to be had to the accompanying drawings, in which—

Figure 1, is a side elevation of a grain weighing and bagging machine embodying my invention. Fig. 2, is an end view of the same. Fig. 3, is a vertical section on the line III—III of Fig. 1. Fig. 4, is a side view of a part of the machine with certain parts omitted and with those shown in the position they occupy just after one sack has been charged with a predetermined weight. Fig. 5, is a top plan view of the machine. Fig. 6, is an enlarged side view of a part of the machine with the bracket forming part of it in vertical section. Fig. 7, is a view of the opposite side of a part of the machine, from that shown in Fig. 1. Fig. 8, is a similar view with certain of the parts occupying different positions.

In the said drawings, a frame comprises a substantially oblong rectangular base 1, a pair of inverted-U shaped frames 2, mounted upon the base near its front end and rear edges and cross bars 3 connecting said frames near their upper corners, said frames 2 and cross bars 3 being preferebly of gas pipe.

4 indicates a pair of inverted-U shaped frames mounted upon the bridging portions of frames 2, and 5 is a hopper mounted upon and between frames 4 and provided with a semi-cylindrical bottom 6, having a central slot or discharge opening 6ª.

Journaled in the hopper and extending through the same at its junction with the bottom 6, is a shaft 7 and secured rigidly on said shaft is a valve 8 which when closed is disposed horizontally so as to cut off communication between the top and bottom portions of the hopper. When the valve is open it occupies a vertical position and the grain is free to flow through the hopper and pass out through the discharge opening 6ª. A crank arm 9 is secured on the front end of shaft 7 for a purpose which hereinafter appears.

10 indicates -U shaped frames arranged centrally between the frames at the front and rear sides of the hopper and pivoted to and between said frames 10 is a tiltable chute 11, of U-shape when veiwed from the end of the machine, with its arms or flanges interposed between frames 10 and the lower portion of the bottom of the hopper to compel the grain escaping through the opening 6ª to drop vertically down upon the bottom of the chute and be discharged thereby from its lower or depressed end.

12 indicates a pair of oblong rectangular frames provided with depending arms 13 terminating in points 14 fitting pivotally in cross bars 3, as shown in Fig. 4, or otherwise pivotally mounted, and projecting from the front ends of frames 12 are inwardly projecting scale levers 15, the inner end of one of said levers being bent as at 16 to overhang the other and of greater length than the latter, the inner end of said prolonged lever being pivotally connected by link 17 with the crank arm 9. The inner end of the companion lever 15 is pivotally connected by a link 18 with the overlying portion 16 of the companion lever.

20 indicates hooks depending from the outer ends of the scale levers and engaging the ends of and supporting a rectangular frame 21 provided centrally of its front and rear sides with upwardly projecting bifurcated bearing plates 22 to receive the central guide pins 23 of a substantially oblong rectangular rock frame 24 (capable of swinging as indicated in Fig. 4,) and secured by set screws 25 upon the sides of the rock frame are slides 26 provided with bearing arms 27 to rest upon frame 21 when the rock frame occupies a horizontal position and adapted for alternately forming fulcrum points for said rock frame.

28 indicates pivot rods extending across frame 24 at opposite sides of and equal distances from its center and pivotally suspended from said pivot rods are links 29 pivotally carrying bars 30 from which depend rods 31 attached at their lower ends to platforms 32, as rests or supports for the grain-receiving receptacles, not shown— such receptacles being preferably sacks with their upper ends distended by and fitting around the lower or discharge ends of a pair of substantially elbow-shaped tubes 33 arranged within frame 24 near its opposite ends and pivotally mounted on said rods 28 carried by said frame. Said elbow-shaped tubes have their upper ends converging upwardly with respect to each other and are so disposed that the corresponding ends of the chute may enter them though never at the same time.

Secured to and carried by said tubes are brackets 34 equipped at their upper ends and between the tubes with anti-friction rollers 35, the roller 35 supported from each tube being disposed at the opposite side of the pivotal point of the chute 11 from said tube, as shown clearly in Fig. 6.

36 indicates brackets secured to the front and rear sides of tubes 33, and 37 vertical rock bars journaled in said bracket and provided at their lower ends with pronged cranks 38 and at their upper ends with handles 39, the handles being utilized for turning the rock bars and causing their pronged cranks to reliably engage or grip the upper ends of the sacks to secure the same reliably to the tubes by which they are distended or held open.

40 indicates a hanger pivotally suspended from one of the pivots 23 outward of the contiguous side of frame 21 and equipped at its lower end with a loop 41, containing a grooved roller 42 for engagement with the lower side of a rod 43 extending through said loop and pivoted at one end to a depending arm 44 of frame 21 the said rod being provided with an adjustable weight 45 at the opposite side of the hanger arm 44.

46 is a link pivotally connecting the lower end of link 18 with the vertically movable scale beam 47 fulcrumed at 48 in the outer side of the opposite side of frame 21 from weighted rod 43, and equipped at its free end with a weight 49, which balances the vertically movable frame 21, when the poise 50 on said beam is disposed at the inner end of its graduations. The opposite end of said beam is equipped with a bearing arm 51 projecting into the looped lower end of an extensible and contractible link 52, pivotally connected at its upper end to the inner end of a scale beam 53 fulcrumed at 54 on the contiguous side of frame 2, and provided with an adjustable poise 55 and resting on a pin 56 of the support.

Assuming that it is desired to supply each bag, not shown, suspended from the elbow tubes, as hereinbefore explained, with one hundred pounds of grain, the operator adjusts poise 50 on beam 47 to, say ninety five pounds or any other desired number of pounds less than but preferably approximating one hundred pounds. He then adjusts poise 55 on beam 53 to one hundred and five pounds, if poise 50 is adjusted at ninety five pounds, on beam 47, or to the pound mark exceeding one hundred pounds by as much as the pound mark to which the poise 50 is adjusted, is less than one hundred pounds. Assuming that the machine is thus adjusted in Fig. 1, it will be seen that the grain discharged from the hopper is deflected by the chute into the left-hand tube 33 and enters the sack suspended therefrom until said sack attains a weight of ninety five pounds and hence pulls frame 21 vertically downward and consequently rocks upward the inner ends of levers 15 through the pull on the outer ends of said levers of hooks 20. The upward movement of the inner ends of said levers raises the scale beam 47, the operation of levers 15 and beam 47 resulting through the connections described, in turning the valve until it is nearly closed and materially reduces the stream of grain passing from the hopper 5 through the chute and into said bag. When the grain in the bag attains a weight of one hundred pounds the tilting frame 24 tilts downward with bearings 27 at the same side of its center as the loaded bag, as the fulcrum point, the tube at the opposite side of the fulcrum point moving upward at the same time and through the instrumentality of its bracket 34 reversing the position of the chute, that is rocking it so that its originally elevated end shall be depressed and thus deflect the grain falling upon it into the empty bag through the elbow tube carrying the same. As the said tilting action occurs the pins 23 ride upward in the bifurcated guides 22 and causes the hanger 40 attached to one of said pins to swing the weighted rod 43 upward, it being obvious that as said rod is raised, the hanger rolls outward upon it and thereby more easily overcomes its weight which as will be readily understood tends to resist the tilting action of frame 24. As a result of this diminishing leverage of said weight on the tilting frame the tilting action thereof is made more rapid, the effect being the same as though an extra weight were suddenly imposed upon the bag. The comparatively thin stream of grain continues to enter the elevated bag until it attains a weight equal to the difference between one hundred pounds and the excess weight indicated by the poise 55 or five pounds, if the latter registers with the one hundred and five pound mark on beam 53. As soon as this weight is imposed on the elevated bag, frame 21 resumes its downward movement and levers 15 and 47 resume their upward movement and at the same time the bearing 51 of beam 47 pulls downward on link 52 and thereby raises the weighted end of beam 53, the valve at the same time attaining its full closed position. The parts remain in this position with one bag containing one hundred pounds and the other five pounds until the loaded bag is removed, when the frame 21 returns to its original elevated position and beams 47 and 53 and levers 15 return to their original positions and thus reopen the valve to permit the grain to flow rapidly into the unloaded sack until it attains a weight of ninety five pounds, when the frame 21 and the connected parts repeat the operations described. All subsequent operations are repetitions as will be readily understood.

From the above description it will be apparent that I have produced a grain weighing and bagging machine equipped with means which insures a quick tilting of the tilting frame and thereby facilitates the weighing operation and which also is provided with means for reducing the flow of the grain just before the bag attains its full weight for the purpose of insuring a more accurate weighing operation, and I wish it to be understood that I do not wish to be restricted to the exact details of construction shown and described as obvious modifications will suggest themselves to one skilled in the art.

Having thus described the invention what I claim as new and desire to secure by Letters-Patent, is:

1. In a grain weighing and bagging machine, the combination with a suitable support, levers mounted thereon and linked together, a frame supported by said levers at the opposite sides of their pivotal points from their linked ends, a tilting frame having bearings at opposite sides of its center upon the lever-carried frame, tubes carried by the tilting frame, a valve-controlled hopper, a chute below the hopper to discharge into either of said tubes, means connecting the inner ends of the levers with the valve to close the same when said ends move upward, a scale beam pivoted on the frame supported by the levers, a link connecting the beam with the inner end of one of said levers, and a poise adjustable on said scale beam.

2. In a grain weighing and bagging machine, the combination with a suitable support, levers mounted thereon and linked together, a frame supported by said levers at the opposite sides of their pivotal points from their linked ends, a tilting frame having bearings at opposite sides of its center upon the lever-carried frame, tubes carried by the tilting frame, a valve-controlled hopper, a chute below the hopper to discharge into either of said tubes, means connecting the inner ends of the levers with the valve to close the same when said ends move upward, a scale beam pivoted on the frame supported by the levers, a link connecting the beam with the inner end of one of said levers, a poise adjustable on said scale beam, a scale beam pivoted to the support, an adjustable poise thereon, and a link pivoted to said beam at one end and having a pin and slot connection at the other with the first-named scale beam.

3. A grain weighing and bagging machine, comprising a suitable support, levers fulcrumed thereon, a link pivotally connecting their inner ends, a frame supported from their outer ends, a tilting frame having bearings at opposite sides of its center on the first-named frame, tubes pivotally carried by and extending through said tilting frame, a stationary hopper, a tilting chute below the same to conduct grain into either of said tubes, brackets secured to the tubes and adapted as their respective tubes move upward to tilt the chute and position it to deliver into the elevated tube, a hanger pivotally pendent from the center of the tilting frame, and a weighted lever bearing down upon said hanger and supported from said first-named frame and adapted to be raised with each tilting action of the tilting frame.

In testimony whereof I affix my signature, in the presence of two witnesses.

MONROE DAVIS.

Witnesses:
H. C. RODGERS,
G. Y. THORPE.